(No Model.)
J. W. BOULDIN.
PLOW POINT.
No. 545,193. Patented Aug. 27, 1895.
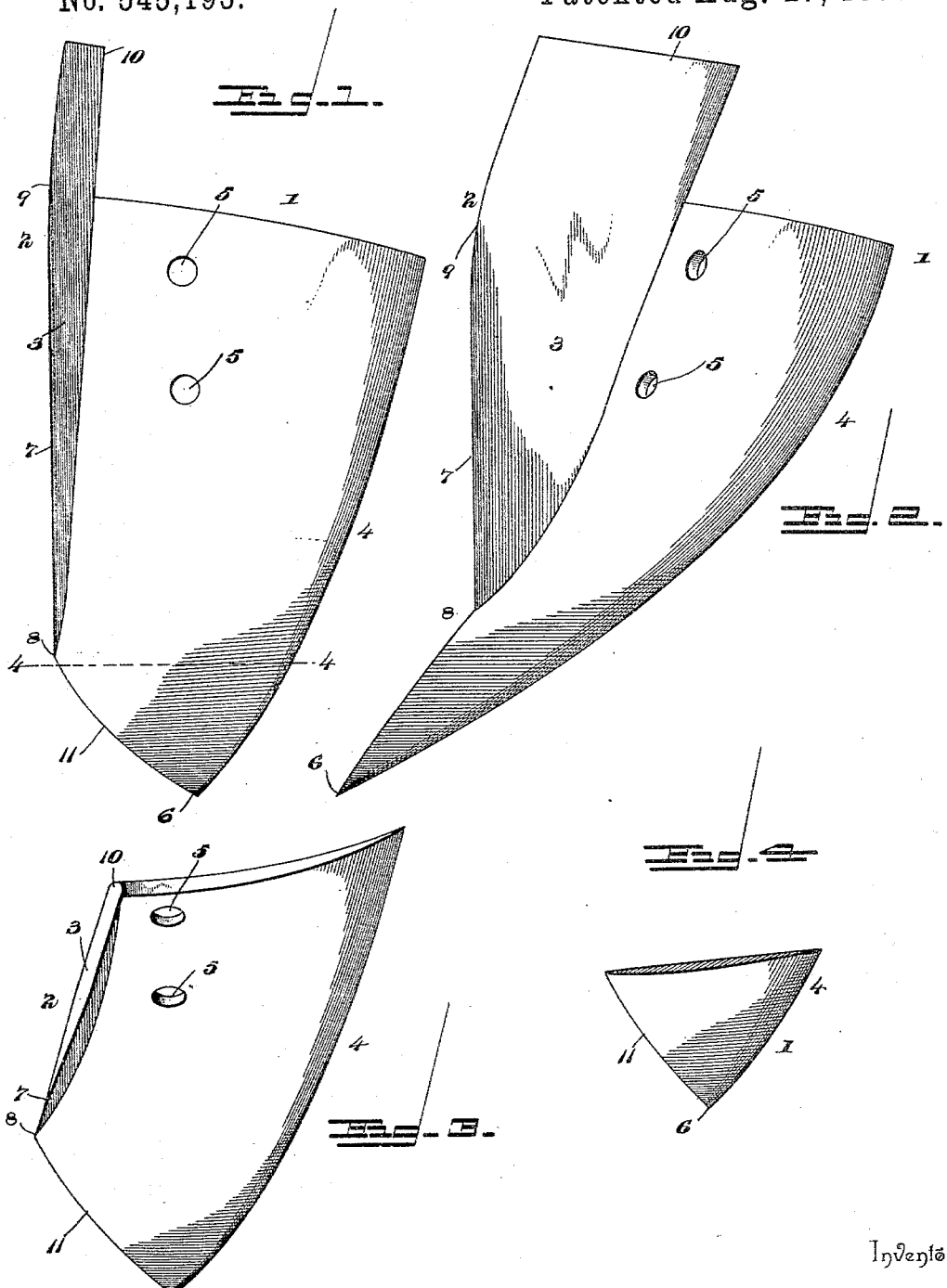
Witnesses
E. K. Stewart
Inventor
James W. Bouldin
By his Attorneys
C. A. Snow & Co.

UNITED STATES PATENT OFFICE.

JAMES W. BOULDIN, OF PRESCOTT, ARKANSAS.

PLOW-POINT.

SPECIFICATION forming part of Letters Patent No. 545,193, dated August 27, 1895.

Application filed February 19, 1894. Serial No. 500,818. (No model.)

*To all whom it may concern:*

Be it known that I, JAMES W. BOULDIN, a citizen of the United States, residing at Prescott, in the county of Nevada and State of Arkansas, have invented a new and useful Plow-Point, of which the following is a specification.

My invention relates to plow-points, and particularly to those provided with cutters and fenders to cut the soil in advance of the body portion of the plow and contiguous to the row of plants to prevent the uprooting of the same while cultivating the soil adjacent thereto; and the object in view is to simplify and improve the construction of devices of this class and provide for the manufacture of the same at a small cost, the inclination of the cutter or fender toward the row of plants which is being cultivated being compensated for by the opposite inclination of the feeding-point of the blade, whereby the blade is adapted to advance without lateral deflection due to said inclination of the cutter or fender.

Further objects and advantages of the invention will appear in the following description, and the novel features thereof will be particularly pointed out in the appended claim.

In the drawings, Figure 1 is a front view of a plow constructed in accordance with my invention. Fig. 2 is a side view of the same. Fig. 3 is a plan view. Fig. 4 is a transverse horizontal section on the line 4 4 of Fig. 1.

Similar numerals of reference indicate corresponding parts in all the figures of the drawings.

The body portion or blade 1 of the improved plow is provided with a straight approximately-vertical right-hand edge 2, from which projects an integral cutter or fender 3, thereby forming at 2 an angle which is slightly greater than a right angle in any horizontal plane intersecting the plow. Any point in the line described by this angle 2 is at the most advanced point of any horizontal plane intersecting the plow-blade, whereby said blade recedes from this angle toward the opposite or left-hand edge 4, which is shaped similar to other cultivating-plows heretofore in use. The openings 5 for the reception of bolts to secure the plow to the standard of a plow-frame are disposed at a sufficient distance from the angle 2 to provide for the proper manipulation of said bolts, and hence are not at the front or most advanced point of the blade, as in the usual practice. In order to provide for dividing the soil by the front edge of the cutter or fender and avoid friction or contact of the surface of the cutter or fender with the wall or bank of earth contiguous to the row of plants, said contact or friction being liable in loose soils to cause the crumbling or caving in thereof, said cutter or fender is inclined laterally toward its front or cutting edge or is inclined from the center of the plow-blade. This causes the outer surface of said cutter or fender to recede from the row of plants as the plow advances. This outward inclination of the cutter or fender toward its front or cutting edge has a tendency to cause the blade to feed toward the row of plants, and therefore, in order to render the operation of the device uniform and avoid unnecessary exertion in the manipulation thereof, I preferably turn the penetrating or feeding point 6 of the plow in the opposite direction from the center line of the blade or from the cutter or fender, whereby it lies approximately in the vertical plane of the centers of the bolt-openings 5. Inasmuch as said bolt-openings are arranged to one side of the center or advance point of the blade, it is obvious that the disposition of the feeding-point 6 in the vertical plane of the centers of said openings throws said point to the opposite side of the center line of the plow from the cutter or fender, and hence compensates any lateral tendency of the cutter or fender.

The cutting-edge 7 of the cutter or fender is arranged in a vertical line from the point of intersection of its lower end with said blade, as shown at 8, to a point approximately in the horizontal plane of the top of the blade, as shown at 9, and from this point upward the front edge of the cutter or fender recedes to the upper extremity of the extension or ear 10, which rises above the plane of the upper edge of the blade to prevent stones, clods, and other heavy objects from falling toward the row of plants during the turning of the soil.

It will be seen from the above description that the cutter or fender is arranged in a vertical plane with its point of intersection with the body portion of the plow at the most advanced part of the blade, whereby soil coming in contact with the inner surface of the cutter and passing from thence to the front surface of the blade is allowed to slide laterally, and direct opposition of the forward movement of the plow is avoided. It will be seen, furthermore, that no part of the plow, including the cutter or fender and the body portion or blade, inclines or is convexed toward the row of plants, the edge 11 of the feeding-point 6 being at any given point more advanced than any point in a horizontal plane intersecting said feeding-point. It will be seen, furthermore, that the necessary inclination of the cutter or fender to prevent disturbing the soil contiguous to the plants is compensated for by an opposite inclination of the feeding-point, whereby uniformity of operation is secured. Furthermore, the cutting-edge of the cutter or fender is arranged vertical to prevent either raising the soil or the plow, or, in other words, affecting the depth of the furrow in manipulating hard soil.

Having described my invention, what I claim is—

A plow point having a forwardly convexed body portion or blade, and an integral cutter or fender projecting forward from one edge of the body portion or blade, the line of intersection of the cutter and the blade being in advance of those portions of the blade in the same horizontal plane, and the angle of intersection being greater than a right angle, whereby the cutter inclines outward or from the blade toward its front or cutting edge, the lower end of the body portion or blade forming a feeding point which inclines laterally in the opposite direction from the cutter or fender to compensate for the lateral draft caused by the cutter or fender, substantially as specified.

In testimony whereof I affix my signature in the presence of two witnesses.

J. W. BOULDIN.

Witnesses:
M. W. GREESON,
JNO. W. HATLEY.